United States Patent
Baldwin et al.

(10) Patent No.: US 12,109,522 B2
(45) Date of Patent: Oct. 8, 2024

(54) OMNI-DIRECTIONAL PARTICULATE EXTRACTION INLET

(71) Applicant: Kidde Technologies, Inc., Wilson, NC (US)

(72) Inventors: Eli Baldwin, Knightdale, NC (US); Mark P. Fazzio, Wilson, NC (US); James Allen Varnell, Black Creek, NC (US); Benjamin Jackson, Fairfax, VA (US); Harlan Hagge, Zebulon, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 462 days.

(21) Appl. No.: 17/484,774

(22) Filed: Sep. 24, 2021

(65) Prior Publication Data
US 2023/0115355 A1   Apr. 13, 2023

(51) Int. Cl.
*B01D 45/08* (2006.01)
*G01N 1/22* (2006.01)

(52) U.S. Cl.
CPC .......... *B01D 45/08* (2013.01); *G01N 1/2208* (2013.01); *B01D 2221/10* (2013.01)

(58) Field of Classification Search
CPC ..... B01D 45/08; G01N 1/2208; G01N 1/2273
See application file for complete search history.

(56) References Cited

U.S. PATENT DOCUMENTS

| | | | |
|---|---|---|---|
| 4,461,183 A | 7/1984 | Wedding | |
| 5,317,930 A * | 6/1994 | Wedding | G01N 1/2273 73/863.03 |
| 5,412,975 A | 5/1995 | Raabe et al. | |
| 8,475,577 B2 | 7/2013 | Novosselov et al. | |
| 2011/0232498 A1* | 9/2011 | Novosselov | B01D 45/06 96/413 |
| 2015/0060092 A1* | 3/2015 | Kho | A62C 3/0207 169/44 |

OTHER PUBLICATIONS

Rohit Ravindra Nene; "Design of Bioaerosol Sampling Inlets"; Texas A&M University; May 2006; 89 pages.
European Search Report for Application No. 22191883.2, mailed Feb. 14, 2023, 8 pages.

* cited by examiner

*Primary Examiner* — David Z Huang
(74) *Attorney, Agent, or Firm* — CANTOR COLBURN LLP (57) ABSTRACT

A flow control device is including a tubular body including a tubular wall with an inner surface, an outer surface, and one or more openings extending from the outer surface to the inner surface through the tubular wall; a faired body encircling the tubular body, the faired body including a radially inner surface and a radially outer surface; and a flow shield encircling the faired body, the flow shield including a radially inward surface and a radially outward surface, the radially inward surface being in a facing spaced relationship with the radially outer surface of the faired body defining a passageway therebetween, wherein the passageway is fluidly connected to the one or more openings.

16 Claims, 5 Drawing Sheets

OMNI-DIRECTIONAL PARTICULATE EXTRACTION INLET

BACKGROUND

The subject matter disclosed herein relates generally to the field of particle concentration measurement, and specifically to a flow control device for a particle concentration measurement sensor.

The distribution and concentration of particles in an environment may be determined for a number of reasons. In the exemplary case of a fire suppression system that deploys an agent to extinguish a fire, the concentration of fire suppression agent in the environment may be determined and used to verify that the fire suppression agent has reached a sufficient concentration or to control the release of additional agent. In other scenarios, the concentration of a particular (hazardous) material in the air may trigger an alert.

BRIEF SUMMARY

According to one embodiment, a flow control device is provided. the flow control device includes: a tubular body including a tubular wall with an inner surface, an outer surface, and one or more openings extending from the outer surface to the inner surface through the tubular wall; a faired body encircling the tubular body, the faired body including a radially inner surface and a radially outer surface; and a flow shield encircling the faired body, the flow shield including a radially inward surface and a radially outward surface, the radially inward surface being in a facing spaced relationship with the radially outer surface of the faired body defining a passageway therebetween, wherein the passageway is fluidly connected to the one or more openings.

In addition to one or more of the features described above, or as an alternative, further embodiments may include an inlet defined between the radially inward surface of the flow shield and the radially outer surface of the faired body, wherein the passageway extends from the inlet to the one or more openings.

In addition to one or more of the features described above, or as an alternative, further embodiments may include that the inlet is an omnidirectional orifice extending a full three hundred and sixty degrees around the faired body.

In addition to one or more of the features described above, or as an alternative, further embodiments may include that the passageway has a rotationally axisymmetric bell shaped curve.

In addition to one or more of the features described above, or as an alternative, further embodiments may include that the faired body has a bell shape and is rotationally axisymmetric.

In addition to one or more of the features described above, or as an alternative, further embodiments may include that the flow shield has a bell shape and is rotationally axisymmetric.

In addition to one or more of the features described above, or as an alternative, further embodiments may include that the faired body has a first faired body end and a second faired body end located opposite the first faired body end, and wherein the radially outer surface of the faired body has a first outer diameter proximate or at the first faired body end and the radially outer surface of the faired body has a second outer diameter proximate or at the second faired body end, the second outer diameter being greater than the first outer diameter.

In addition to one or more of the features described above, or as an alternative, further embodiments may include that an outer diameter of the radially outward surface increases exponentially from the first outer diameter to the second outer diameter.

In addition to one or more of the features described above, or as an alternative, further embodiments may include that the flow shield has a first flow shield end and a second flow shield end located opposite the first flow shield end, and wherein the radially inward surface of the flow shield has a first inner diameter proximate or at a first distance away from the first flow shield end and the radially inward surface of the flow shield has a second inner diameter proximate or at the second flow shield end, the second inner diameter being greater than the first inner diameter.

In addition to one or more of the features described above, or as an alternative, further embodiments may include that an inner diameter of the radially inward surface increases exponentially from the first inner diameter to the second inner diameter.

In addition to one or more of the features described above, or as an alternative, further embodiments may include that the tubular body has a first tubular end and a second tubular end located opposite the first tubular end, the faired body being operably connected to the tubular body proximate or at the first tubular end, wherein the faired body has a first faired body end and a second faired body end located opposite the first faired body end, and wherein the first faired body end is located closer to the first tubular end than the second faired body end.

In addition to one or more of the features described above, or as an alternative, further embodiments may include that the tubular body has a first tubular end and a second tubular end located opposite the first tubular end, the flow shield being operably connected to the tubular body proximate or at the first tubular end, wherein the flow shield has a first flow shield end and a second flow shield end located opposite the first flow shield end, and wherein the first flow shield end is located closer to the first tubular end than the second flow shield end.

In addition to one or more of the features described above, or as an alternative, further embodiments may include that the tubular body further includes a passageway portion defined by the inner surface, and wherein a transition from the passageway to the passageway portion of the tubular body is configured to turn a particle-laden gas about one hundred and eighty degrees.

In addition to one or more of the features described above, or as an alternative, further embodiments may include that the faired body further include one or more channel guides extending away from the radially outer surface of the faired body and toward the radially inward surface of the flow shield.

In addition to one or more of the features described above, or as an alternative, further embodiments may include that the tubular body further includes a passageway portion defined by the inner surface, and wherein a transition from the passageway to the passageway portion of the tubular body is configured to turn a particle-laden gas about ninety degrees.

In addition to one or more of the features described above, or as an alternative, further embodiments may include that the tubular body has a first tubular end and a second tubular end located opposite the first tubular end, the faired body being operably connected to the tubular body proximate or at the first tubular end, wherein the faired body has a first faired body end and a second faired body end located opposite the first faired body end, and wherein the second faired body end is located closer to the first tubular end than the first faired body end.

In addition to one or more of the features described above, or as an alternative, further embodiments may include that the tubular body has a first tubular end and a second tubular end located opposite the first tubular end, the flow shield being operably connected to the tubular body proximate or at the first tubular end, wherein the flow shield has a first flow shield end and a second flow shield end located opposite the first flow shield end, and wherein the second flow shield end is located closer to the first tubular end than the first flow shield end.

According to another embodiment, a method of fabricating a flow control device is provided. The method including: forming a tubular body including a tubular wall with an inner surface, an outer surface, and one or more openings extending from the outer surface to the inner surface through the tubular wall; forming a faired body including a radially inner surface, a radially outer surface, and a channel portion defined by the radially inner surface within the faired body; forming a flow shield the flow shield including a radially inward surface, a radially outward surface, and an interior chamber defined by the radially inward surface within the flow shield; arranging the faired body at least partially within the flow shield such that the radially inward surface is in a facing spaced relationship with the radially outer surface of the faired body defining a passageway therebetween; and arranging the tubular body at least partially within the channel portion such that the passageway is fluidly connected to the one or more openings.

In addition to one or more of the features described above, or as an alternative, further embodiments may include forming a passageway portion within the tubular body to a direct particle-laden gas from the passageway through the one or more openings into the passageway portion and to an inlet of a particle concentration measurement sensor.

In addition to one or more of the features described above, or as an alternative, further embodiments may include that the particle-laden gas includes particles of fire suppression agent suspended in a gas and the particle concentration measurement sensor measures a concentration of the fire suppression agent in the gas.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Fire extinguishing agent concentration measurements of dry chemical agents can be performed by extracting agent laden air into a sensor probe that utilizes light scattering principles. These sensor probes rely on extracting agent laden air at concentrations consistent with the concentration outside the sample inlet. The flow within the room or volume to be protected from a fire threat (i.e., fire threat volume) is turbulent and dynamic. Moreover, during an agent discharge event, the gas velocities in the room or volume can vary from null to tens or even low hundreds of meters per second. Particle slip in this environment makes consistent sampling of agent laden gas a challenge. Particle slip occurs when the particle (in this case a dry chemical agent) has a significantly different velocity than the air surrounding it. Thus, particle slip at the inlet of a concentration sensor can result in over-sampling or under-sampling the dry chemical agent. Particle slip will be greatest in regions where flow acceleration is highest.

Embodiments disclosed herein relate to a fire extinguishing agent sampling probe having an omni-directional flow shield around an omni-directional inlet orifice. Advantageously, the omni-directional flow shield protects the omni-directional flow sample inlet from the dynamic and turbulent flows that exist in the fire threat volume. The omni-directional flow shield helps provide the omni-directional sample inlet orifice with dry chemical agent laden air at concentrations that are representative of the concentrations outside of the omni-directional flow shield.

Further, embodiments disclosed herein relate to a fire extinguishing agent sampling probe having a gentle bell-shaped omnidirectional curve to a passageway portion leading to the omni-directional inlet orifice. When sampling a fire extinguishing agent that is dry chemical mixed in with air through an inlet orifice, particle slip may tend to skew the sampled concentration of the dry chemical. The concentration can be over-sampled or under-sampled depending on the directionality flow relative to the inlet. For example, if the airflow is blowing into an unshielded inlet orifice, the concentration can be over-sampled, but if the airflow is blowing away from an unshielded inlet orifice the concentration can be under-sampled. The embodiments disclosed herein help mitigate this problem by protecting the inlet orifice from the bulk flow and providing flow paths that are subject to gentle acceleration, thus minimizing particle slip.

Figure 1:
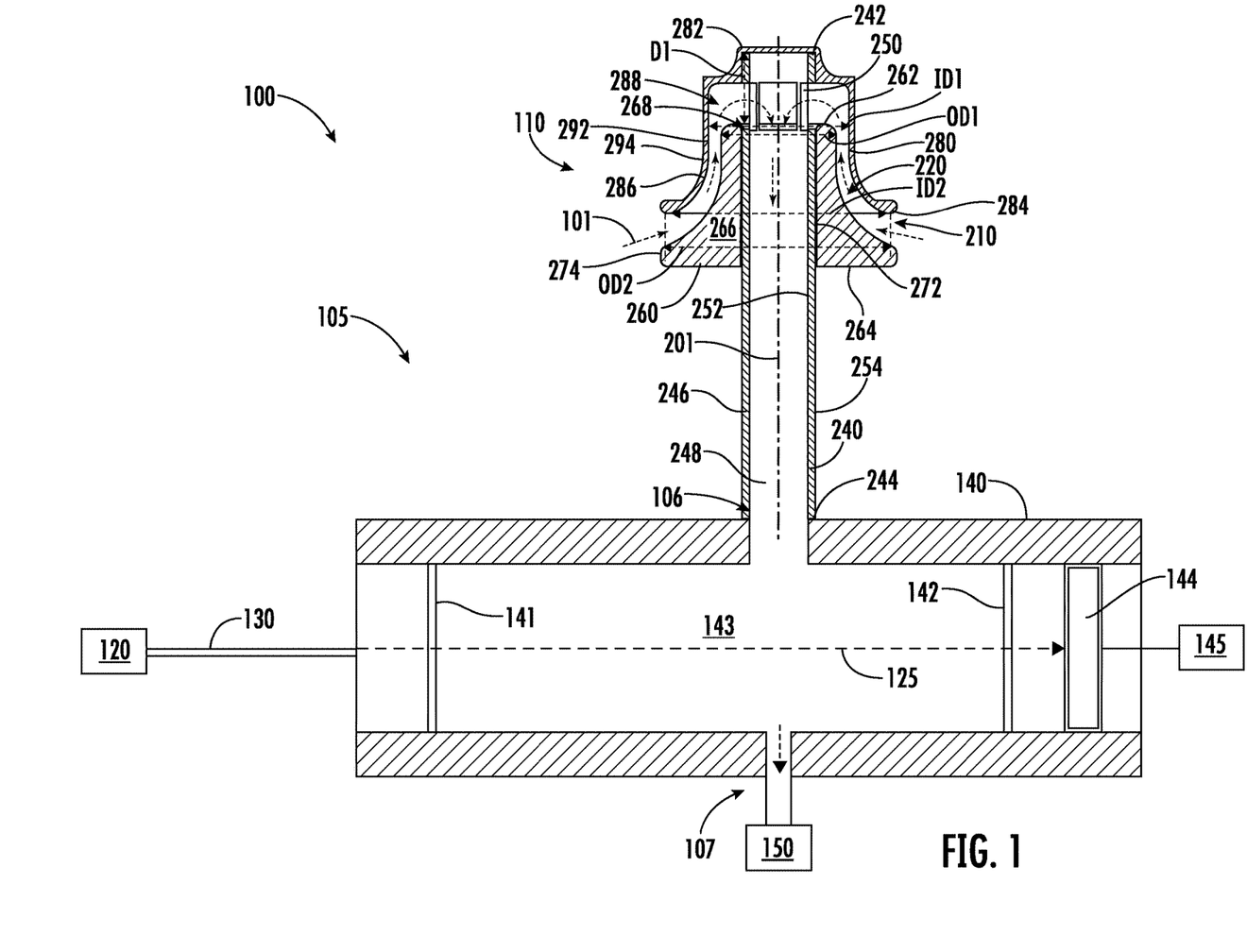
FIG. 1 illustrates is a cross-sectional view of a particle concentration measurement sensor, according to an embodiment of the present disclosure.
Figure 2:
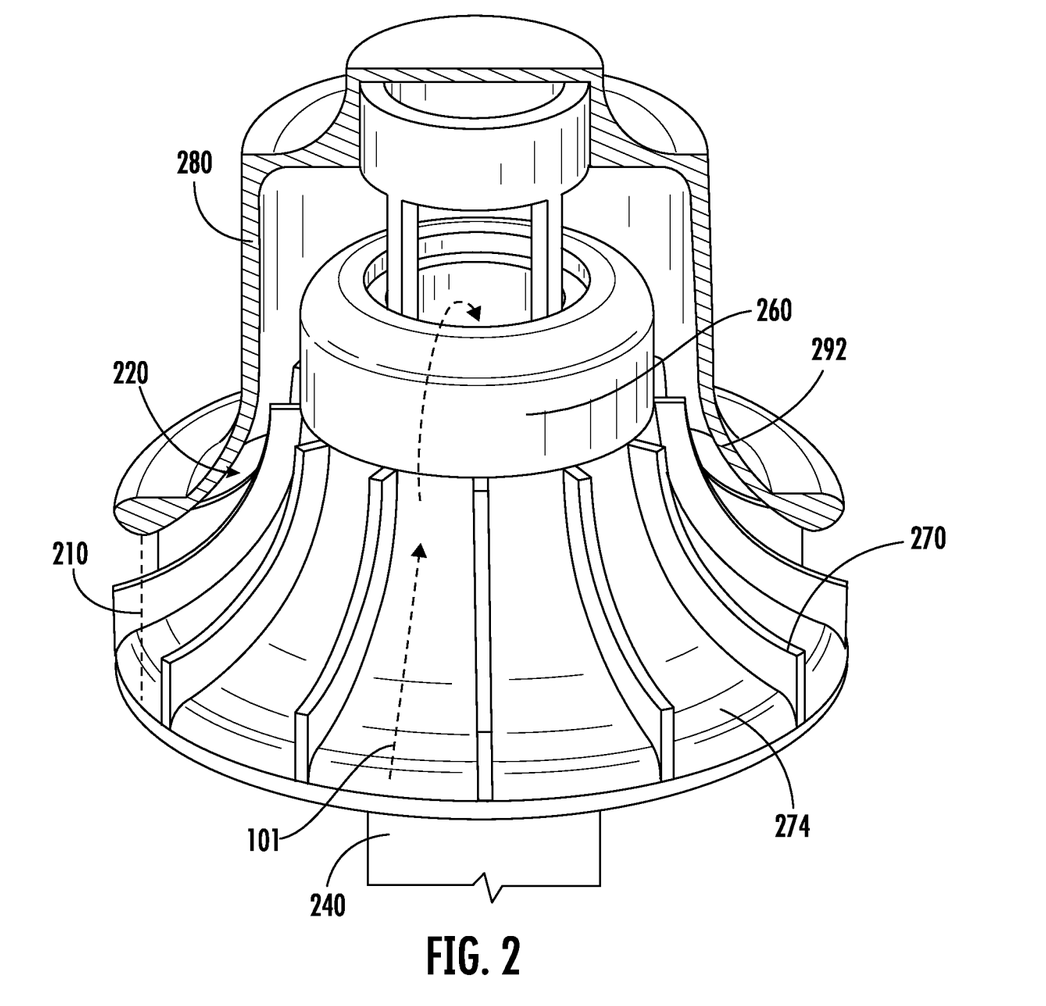
FIG. 2 illustrates an enlarged isometric view of a flow control device for the particle concentration measurement sensor of FIG. 1, according to an embodiment of the present disclosure.

Referring now to FIG. 1, a cross-sectional view of a particle concentration measurement sensor 105 with a flow control device 110 is illustrated in accordance with an embodiment of the present disclosure.

According to an embodiment, the particle concentration measurement sensor 105 is part of a fire suppression system 100 and is used to determine the concentration of a fire suppression agent in particle-laden gas 101 that is drawn into a housing 140 of the particle concentration measurement sensor 105 through the flow control device 110 at an inlet 106. A vacuum source 150 may be coupled at an outlet 107 of the housing 140 to draw gas through from the inlet 106 to the outlet 107. As the cross-sectional view of the particle concentration measurement sensor 105 indicates, a first window 141 and a second window 142 define an interaction region 143 within the housing 140.

According to the exemplary embodiment of the particle concentration measurement sensor 105 shown in FIG. 1, a light source 120 provides input light 125 via an optical fiber 130 to the housing 140. In the interaction region 143, the light 125 and the particle-laden gas 101 entering the housing 140 via the inlet 106 interact. This interaction is detected at a detector 144 outside the interaction region 143. Specifically, the detector 144 measures an intensity of the post-interaction light that corresponds with the particle of interest (e.g., fire suppression agent) in the particle-laden gas 101. A controller 145 may map that intensity to a concentration. According to alternate embodiments, the particle concentration measurement sensor 105 may include a mirror at the location at which the detector 144 is shown in FIG. 1. The mirror reflects the result of the light interaction in the interaction region 143 back through the second window 142 and first window 141 toward the light source 120. Thus, the detector 144 and controller 145 may be located at the same side as the light source 120 in the alternate embodiment.

The flow control device 110, according to one or more embodiments, includes features that ensure that the concentration of the particle of interest (e.g., fire suppression agent) in the environment is accurately reflected within the housing 140 in the interaction region 143. The flow control device 110 includes a tubular body 240, a faired body 260, and a flow shield 280.

The tubular body 240 is coaxial to a longitudinal axis 201. The tubular body 240 extends linearly along the longitudinal axis 201 and is parallel to the longitudinal axis 201. The tubular body 240 may be cylindrical in shape with a passageway portion 248 formed therein. The tubular body 240 may be rotationally axisymmetric around the longitudinal axis 201. The tubular body 240 includes a tubular wall 246 that includes an inner surface 252 and an outer surface 254. The inner surface 252 is located radially inward from the outer surface 254 as measured relative to the longitudinal axis 201. That inner surface 252 defines the passageway portion 248. The tubular body 240 includes a first tubular end 242 and a second tubular end 244 located opposite the first tubular end 242. The tubular body 240 is fluidly connected to the housing 140 of the particle concentration measurement sensor 105 at the second tubular end 244. The tubular body 240 includes one or more openings 250 (i.e., perforations or entryways) in the tubular wall 246. The openings 250 extend from the outer surface 254 to the inner surface 252 through the tubular wall 246. Advantageously, the openings 250 are shielded by the from flow shield 280 from a direct airflow shot that may lead to the concentration being over-sampled. The passageway portion 248 fluidly connects the openings 250 to the inlet 106 and then to the interaction region 143 within the housing 140.

The faired body 260 is operably connected to the tubular body 240 proximate or at the first tubular end 242. The faired body 260 is located a first distance D1 away from the first tubular end 242 as measured along the longitudinal axis 201. The openings 250 within the tubular body 240 are located between the faired body 260 and the first tubular end 242, as illustrated in FIG. 1. The faired body 260 encircles the tubular wall 246.

The faired body 260 may have a bell shape with a channel portion 268 formed therein. The faired body 260 may be rotationally axisymmetric around the longitudinal axis 201. The faired body 260 includes a faired body wall 266 that includes a radially inner surface 272 and a radially outer surface 274. The radially inner surface 272 is located radially inward from the radially outer surface 274 as measured relative to the longitudinal axis 201. That radially inner surface 272 defines the channel portion 268 within the faired body 260. The tubular body 240 is configured to fit within the channel portion 268. The outer surface 254 of the tubular body 240 and the radially inner surface 272 of the faired body 260 may be in an interference fit or press fit with each other. Alternatively, the tubular body 240 could be connected to the faired body 260 by an appropriate adhesive such as epoxy, or depending on material the attachment means could also be soldering, welding, brazing, or a similar attachment means known to one of skill in the art. Also alternatively, the tubular body 240 and the faired body 260 may be one integral piece of material that may have been formed by turning on a lathe from bar stock material or additive manufacturing. The faired body 260 includes a first faired body end 262 and a second faired body end 264 located opposite the first faired body end 262. The first faired body end 262 is located closer to the first tubular end 242 than the second faired body end 264, as illustrated in FIG. 1. The second faired body end 264 is located closer to the second tubular end 244 than the first faired body end 262, as illustrated in FIG. 1.

The radially outer surface 274 of the faired body 260 may have a first outer diameter OD1 proximate or at the first faired body end 262 and the radially outer surface 274 of the faired body 260 may have a second outer diameter OD2 proximate or at the second faired body end 264. The second outer diameter OD2 is greater than the first outer diameter OD1. An outer diameter of the radially outer surface 274 may increase exponentially from the first outer diameter OD1 to the second outer diameter OD2. This exponential increase in a size of the outer diameter size results in the bell shape of the radially outer surface 274 of the faired body 260.

The flow shield 280 is operably connected to the tubular body 240 proximate or at the first tubular end 242. The flow shield 280 may be located at the first tubular end 242 and may cover the first tubular end 242, as illustrated in FIG. 1. The openings 250 within the tubular body 240 are located between the flow shield 280 and the faired body 260, as illustrated in FIG. 1. The flow shield 280 encircles the faired body 260 and the tubular wall 246.

The flow shield 280 may have a bell shape with an interior chamber 288 formed therein. The openings 250 within the tubular body 240 are located with the interior chamber 288 of the flow shield 280. The flow shield 280 may be rotationally axisymmetric around the longitudinal axis 201. The flow shield 280 includes a flow shield wall 286 that includes a radially inward surface 292 and a radially outward surface 294. The radially inward surface 292 is located radially inward from the radially outward surface 294 as measured relative to the longitudinal axis 201. That radially inward surface 292 defines the interior chamber 288. A portion of the tubular body 240 is configured to fit within the interior chamber 288 and a portion of the faired body 260 is configured to fit within the interior chamber 288. The outer surface 254 of the tubular body 240 proximate the first tubular end 242 and a portion of the radially inward surface 292 of the flow shield 280 may be in an interference fit or press fit. with each other. Alternatively, the outer surface 254 of the tubular body 240 proximate the first tubular end 242 could be connected to a portion of the radially inward surface 292 of the flow shield 280 by an appropriate adhesive such as epoxy, or depending on material the attachment means could also be soldering, welding, brazing, or a similar attachment means known to one of skill in the art. Also alternatively, the tubular body 240 and the flow shield 280 may be one integral piece of material that may have been formed by turning on a lathe from bar stock material or additive manufacturing. The flow shield 280 includes a first flow shield end 282 and a second flow shield end 284 located opposite the first flow shield end 282. The first flow shield end 282 is located closer to the first tubular end 242 than the second flow shield end 284, as illustrated in FIG. 1. The second flow shield end 284 is located closer to the second tubular end 244 than the first flow shield end 282, as illustrated in FIG. 1.

The radially outward surface 294 of the flow shield 280 may have a first inner diameter ID1 proximate or at the first distance D1 away from the first flow shield end 282 and the radially outward surface 294 of the flow shield 280 may have a second inner diameter ID2 proximate or at the second flow shield end 284. The second inner diameter ID2 is greater than the first inner diameter ID1. An inner diameter of the radially outward surface 294 may increase exponentially from the first inner diameter ID1 to the second inner diameter ID2. This exponential increase in a size of the inner diameter results in the bell shape of the radially outward surface 294 of the flow shield 280.

The radially outer surface 274 of the faired body 260 and the radially inward surface 292 of the flow shield 280 are in a facing spaced relationship forming a passageway 220 therebetween. The passageway 220 is rotationally axisymmetric around the longitudinal axis 201. The passageway 220 is also bell shaped as it follows the bell shaped curvatures of the radially outer surface 274 of the faired body 260 and the radially inward surface 292 of the flow shield 280. In an embodiment, the passageway 220 has a rotationally axisymmetric bell shaped curve.

An inlet 210 extends from the radially outer surface 274 of the faired body 260 to the radially inward surface 292 of the flow shield 280. The passageway 220 is fluidly connected to the openings 250. The passageway 220 extends from the inlet 210 to the openings 250. Particle-laden gas 101 is configured to flow into the passageway 220 through the inlet 210. The inlet 210 is rotationally axisymmetric around the longitudinal axis 201. In other words, the inlet 210 is an omnidirectional orifice extending a full three hundred and sixty degrees around the longitudinal axis 201 or the faired body 260. Advantageously, this allows the fire suppression agent in particle-laden gas 101 to flow into the passageway 220 through the inlet 210 from three hundred and sixty degrees around the flow control devices 110.

The gentle rotationally axisymmetric bell shaped curve of the passageway 220 helps slowly bring the particle-laden gas 101 up to the speed of airflow being generated by the vacuum source 150 to prevent separation of the fire suppression agent from the surrounding gas that makes up the particle-laden gas 101. Thus, the rotationally axisymmetric bell shaped curve helps minimize the slip velocity of the fire suppression agent where the particulates of the fire suppression agent may begin separating from the surrounding gas that is carrying the particulates.

The particle-laden gas 101 then makes a one hundred and eighty degrees turn around the 262 the first faired body end 262 of the faired body 260 to enter the passageway portion 248 of the tubular body 240 through the openings 250. In other words, a transition from the passageway 220 to the passageway portion 248 of the tubular body 240 is configured to turn the particle-laden gas 101 about one hundred and eighty degrees. The particle-laden gas 101 is then transported through the passageway portion 248 of the tubular body 240 to the interaction region 143 within the housing 140.

Referring now to FIG. 2, with continued reference to FIG. 1, an isometric view of aspects of the tubular body 240 and the faired body 260, and a cutaway isometric view of the flow shield 280 is illustrated in accordance with an embodiment of the present disclosure. As illustrated in FIG. 2, the radially outer surface 274 of the faired body 260 may include one or more channel guides 270 extending away from the radially outer surface 274 and toward the radially inward surface 292 of the flow shield 280. Advantageously, the channel guides 270 help to straighten or guide the flow of the particle-laden gas 101 within the passageway 220 formed between the radially outer surface 274 of the faired body 260 and the radially inward surface 292 of the flow shield 280. Also, the channel guides 270 help reduce the amount of the particle-laden gas 101 that may enter the passageway 220 through the inlet 210 and then exit back out of the passageway 220 through the inlet 210.

In one embodiment, the channel guides 270 may extend partially across the passageway 220 and terminate in the passageway 220 prior to contacting the radially inward surface 292 of the flow shield 280. In another embodiment, the channel guides 270 may extend completely across the passageway 220 and to contact the radially inward surface 292 of the flow shield 280. It is understood that the embodiments disclosed herein are also applicable to faired bodies 260 without channel guides 270.

Referring now to FIG. 3, a cross-sectional view of a particle concentration measurement sensor 305 with a flow control device 310 is illustrated in accordance with an embodiment of the present disclosure.

According to an embodiment, the particle concentration measurement sensor 305 is part of a fire suppression system 300 and is used to determine the concentration of a fire suppression agent in particle-laden gas 301 that is drawn into a housing 340 of the particle concentration measurement sensor 305 through the flow control device 310 at an inlet 306. A vacuum source 350 may be coupled at an outlet 307 of the housing 340 to draw gas through from the inlet 306 to the outlet 307. As the cross-sectional view of the particle concentration measurement sensor 305 indicates, a first window 341 and a second window 342 define an interaction region 343 within the housing 340.

According to the exemplary embodiment of the particle concentration measurement sensor 305 shown in FIG. 3, a light source 320 provides input light 325 via an optical fiber 330 to the housing 340. In the interaction region 343, the light 325 and the particle-laden gas 301 entering the housing 340 via the inlet 306 interact. This interaction is detected at a detector 344 outside the interaction region 343. Specifically, the detector 344 measures an intensity of the post-interaction light that corresponds with the particle of interest (e.g., fire suppression agent) in the particle-laden gas 301. A controller 345 may map that intensity to a concentration. According to alternate embodiments, the particle concentration measurement sensor 305 may include a mirror at the location at which the detector 344 is shown in FIG. 3. The mirror reflects the result of the light interaction in the interaction region 343 back through the second window 342 and first window 341 toward the light source 320. Thus, the detector 344 and controller 345 may be located at the same side as the light source 320 in the alternate embodiment.

Figure 3:
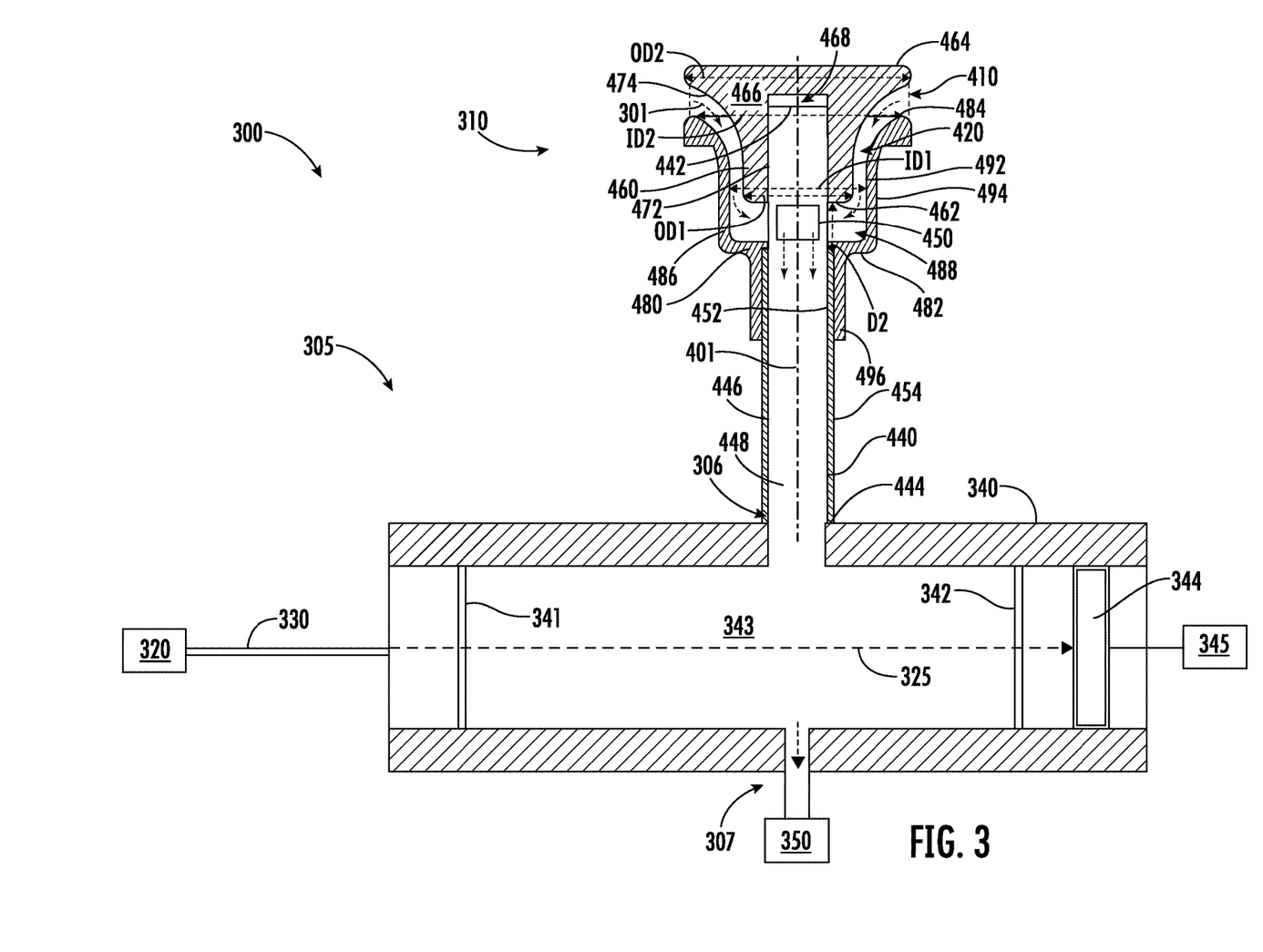
FIG. 3 illustrates is a cross-sectional view of a particle concentration measurement sensor, according to an embodiment of the present disclosure.

The flow control device 310, according to one or more embodiments, includes features that ensure that the concentration of the particle of interest (e.g., fire suppression agent) in the environment is accurately reflected within the housing 340 in the interaction region 343. The flow control device 310 includes a tubular body 440, a faired body 460, and a flow shield 480.

The tubular body 440 is coaxial to a longitudinal axis 401. The tubular body 440 extends linearly along the longitudinal axis 401 and is parallel to the longitudinal axis 401. The tubular body 440 may be cylindrical in shape with a passageway portion 448 formed therein. The tubular body 440 may be rotationally axisymmetric around the longitudinal axis 401. The tubular body 440 includes a tubular wall 446 that includes an inner surface 452 and an outer surface 454. The inner surface 452 is located radially inward from the outer surface 454 as measured relative to the longitudinal axis 401. That inner surface 452 defines the passageway portion 448. The tubular body 440 includes a first tubular end 442 and a second tubular end 444 located opposite the first tubular end 442. The tubular body 440 is fluidly connected to the housing 340 of the particle concentration measurement sensor 305 at the second tubular end 444. The tubular body 440 includes one or more openings 450 (i.e., perforations or entryways) in the tubular wall 446. The openings 450 extend from the outer surface 454 to the inner surface 452 through the tubular wall 446. Advantageously, the openings 450 are shielded by the from flow shield 480 from a direct airflow shot that may lead to the concentration being over-sampled. The passageway portion 448 fluidly connects the openings 450 to the inlet 306 and then to the interaction region 343 within the housing 340.

Alternatively, the faired body 460 may be attached to the tubular body 440 without the tubular body 440 extending into the faired body 460. For example, the faired body 460 may be directly attached to the first tubular end 442 of the tubular body 440 by an attachment means including, but not limited to, an adhesive, soldering, brazing, welding, or any other attachment means known to one of skill in the art. Alternatively, the faired body 460 may be held in position by vertical screws and/or spacers from the flow shield 480.

The faired body 460 is operably connected to the tubular body 440 proximate or at the first tubular end 442. The openings 450 within the tubular body 440 are located between the faired body 460 and the flow shield 480, as illustrated in FIG. 3. The faired body 460 encircles the tubular wall 446.

The faired body 460 may have a bell shape with a channel portion 468 formed therein. The faired body 460 may be rotationally axisymmetric around the longitudinal axis 401. The faired body 460 includes a faired body wall 466 that includes a radially inner surface 472 and a radially outer surface 474. The radially inner surface 472 is located radially inward from the radially outer surface 474 as measured relative to the longitudinal axis 401. That radially inner surface 472 defines the channel portion 468 within the faired body 460. The tubular body 440 is configured to fit within the channel portion 468. The outer surface 454 of the tubular body 440 and the radially inner surface 472 of the faired body 460 may be in an interference fit or press fit with each other. Alternatively, the tubular body 440 could be connected to the faired body 460 by an appropriate adhesive such as epoxy, or depending on material the attachment means could also be soldering, welding, brazing, or a similar attachment means known to one of skill in the art. Also alternatively, the tubular body 440 and the faired body 460 may be one integral piece of material that may have been formed by turning on a lathe from bar stock material or additive manufacturing. The faired body 460 includes a first faired body end 462 and a second faired body end 464 located opposite the first faired body end 462. The second faired body end 464 is located closer to the first tubular end 442 than the first faired body end 462, as illustrated in FIG. 3. The first faired body end 462 is located closer to the second tubular end 444 than the second faired body end 464, as illustrated in FIG. 3.

The radially outer surface 474 of the faired body 460 may have a first outer diameter OD1 proximate or at the first faired body end 462 and the radially outer surface 474 of the faired body 460 may have a second outer diameter OD2 proximate or at the second faired body end 464. The second outer diameter OD2 is greater than the first outer diameter OD1. An outer diameter of the radially outer surface 474 may increase exponentially from the first outer diameter OD1 to the second outer diameter OD2. This exponential increase in a size of the outer diameter results in the bell shape of the radially outer surface 474 of the faired body 460.

The flow shield 480 is operably connected to the tubular body 440 proximate or at the first tubular end 442. The flow shield 480 may be located at the first tubular end 442 and may cover the first tubular end 442, as illustrated in FIG. 3. The openings 450 within the tubular body 440 are located between the flow shield 480 and the faired body 460, as illustrated in FIG. 3. The flow shield 480 encircles the faired body 460 and the tubular wall 446.

The flow shield 480 may have a bell shape with an interior chamber 488 formed therein. The openings 450 within the tubular body 440 are located with the interior chamber 488 of the flow shield 480. The flow shield 480 may be rotationally axisymmetric around the longitudinal axis 401. The flow shield 480 includes a flow shield wall 486 that includes a radially inward surface 492 and a radially outward surface 494. The radially inward surface 492 is located radially inward from the radially outward surface 494 as measured relative to the longitudinal axis 401. That radially inward surface 492 defines the interior chamber 488. A portion of the tubular body 440 is configured to fit within the interior chamber 488 and a portion of the faired body 460 is configured to fit within the interior chamber 488. The outer surface 454 of the tubular body 440 proximate the first tubular end 442 and a portion of the radially inward surface 492 of the flow shield 480 may be in an interference fit with each other. Alternatively, the outer surface 454 of the tubular body 440 proximate the first tubular end 442 could be connected to a portion of the radially inward surface 492 of the flow shield 480 by an appropriate adhesive such as epoxy, or depending on material the attachment means could also be soldering, welding, brazing, or a similar attachment means known to one of skill in the art. Also alternatively, the tubular body 440 and the flow shield 480 may be one integral piece of material that may have been formed by turning on a lathe from bar stock material or additive manufacturing. The flow shield 480 includes a first flow shield end 482 and a second flow shield end 484 located opposite the first flow shield end 482. The second flow shield end 484 is located closer to the first tubular end 442 than the first flow shield end 482, as illustrated in FIG. 3. The first flow shield end 482 is located closer to the second tubular end 444 than the second flow shield end 484, as illustrated in FIG. 3. The flow shield 480 may include a tubular portion 496. The tubular portion 496 may run about parallel with the tubular body 440, as illustrated in FIG. 3. The tubular portion 496 may provide added support for the flow shield 480 on the tubular body 440.

The radially outward surface 494 of the flow shield 480 may have a first inner diameter ID1 proximate or at the second distance D2 away from the first flow shield end 482 and the radially outward surface 494 of the flow shield 480 may have a second inner diameter ID2 proximate or at the second flow shield end 484. The second inner diameter ID2 is greater than the first inner diameter ID1. An inner diameter of the radially outward surface 494 may increase exponentially from the first inner diameter ID1 to the second inner diameter ID2. This exponential increase in a size of the inner diameter size results in the bell shape of the radially inward surface 492 of the flow shield 480.

The radially outer surface 474 of the faired body 460 and the radially inward surface 492 of the flow shield 480 are in a facing spaced relationship forming a passageway 420 therebetween. The passageway 420 is rotationally axisymmetric around the longitudinal axis 401. The passageway 420 is also bell shaped as it follows the bell shaped curvatures of the radially outer surface 474 of the faired body 460 and the radially inward surface 492 of the flow shield 480. In an embodiment, the passageway 420 has a rotationally axisymmetric bell shaped curve.

An inlet 410 extends from the radially outer surface 474 of the faired body 460 to the radially inward surface 492 of the flow shield 480. The passageway 420 is fluidly connected to the openings 450. The passageway 420 extends from the inlet 410 to the openings 450. Particle-laden gas 301 is configured to flow into the passageway 420 through the inlet 410. The inlet 410 is rotationally axisymmetric around the longitudinal axis 401. In other words, the inlet 410 is an omnidirectional orifice extending a full three hundred and sixty degrees around the longitudinal axis 401 or the faired body 460. Advantageously, this allows the fire suppression agent in particle-laden gas 301 to flow into the passageway 420 through the inlet 410 from three hundred and sixty degrees around the flow control devices 310.

The gentle rotationally axisymmetric bell shaped curve of the passageway 420 helps slowly bring the particle-laden gas 301 up to the speed of airflow being generated by the vacuum source 350 to prevent separation of the fire suppression agent from the surrounding gas that makes up the particle-laden gas 301. Thus, the rotationally axisymmetric bell shaped curve helps avoid the slip velocity of the fire suppression agent where the particulates of the fire suppression agent may begin separating from the surrounding gas that is carrying the particulates.

The particle-laden gas 301 then makes a ninety degree turn around the 462 the first faired body end 462 of the faired body 460 to enter the passageway portion 448 of the tubular body 440 through the openings 450. In other words, a transition from the passageway 420 to the passageway portion 448 of the tubular body 440 is configured to turn the particle-laden gas 301 about ninety degrees in two different areas. The first area is a transition from the passageway 420 through the openings 450 and the second area is a transition from the openings 450 to the passageway portion 448 of the tubular body 440. The particle-laden gas 301 is then transported through the passageway portion 448 of the tubular body 440 to the interaction region 343 within the housing 340.

Figure 4:
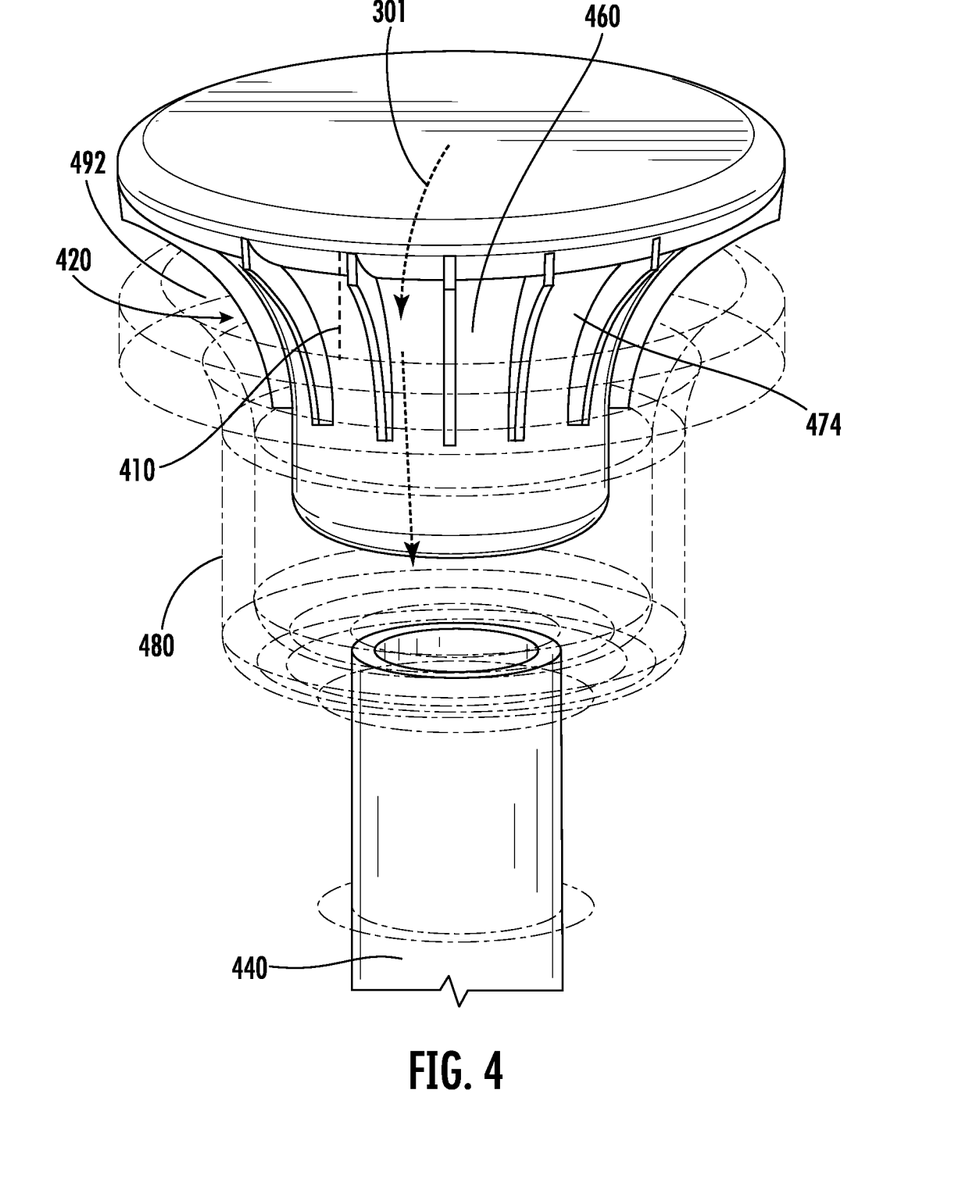
FIG. 4 illustrates an enlarged isometric view of a flow control device for the particle concentration measurement sensor of FIG. 3, according to an embodiment of the present disclosure.
Figure 5:
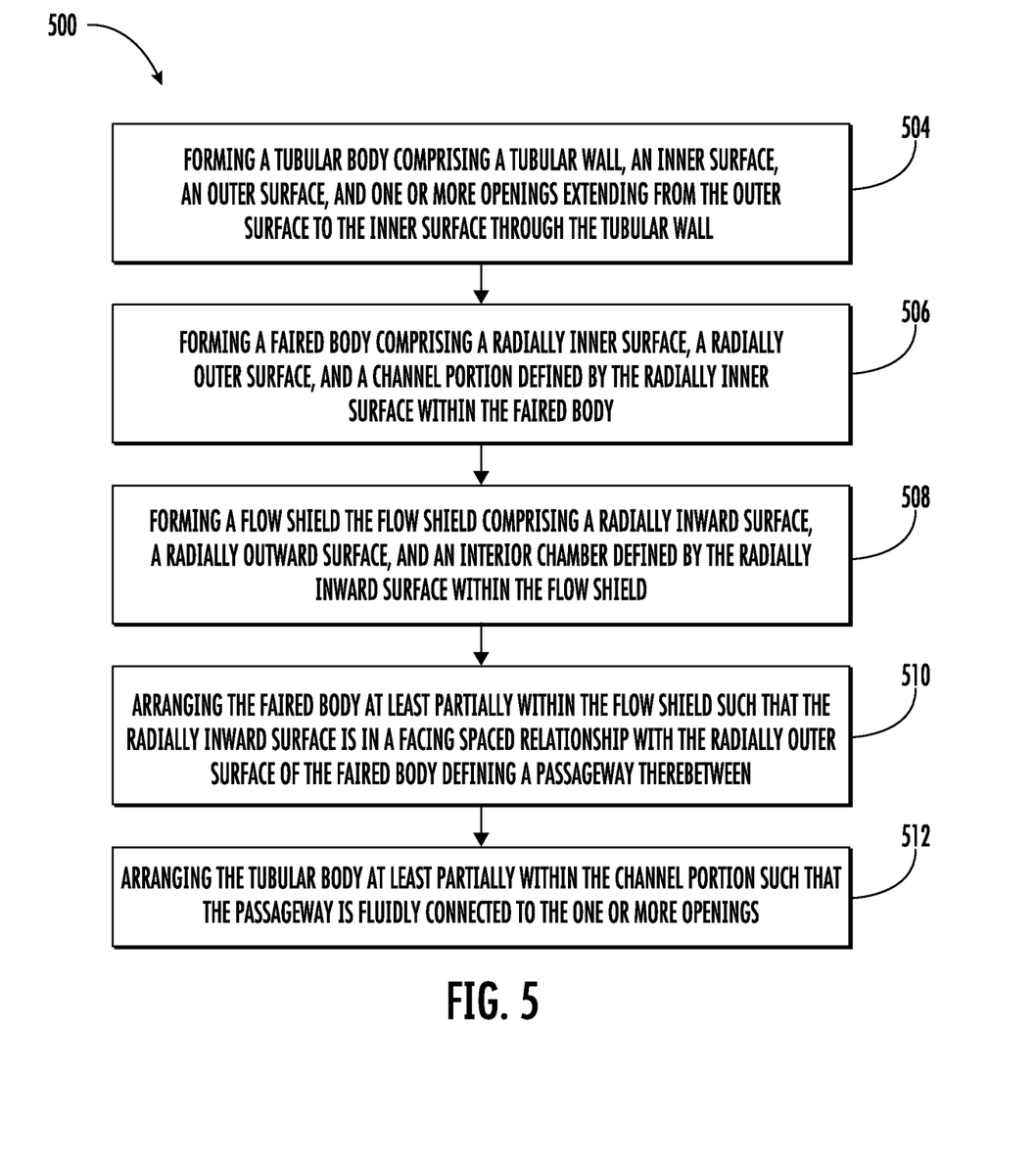
FIG. 5 illustrates a flow chart of a method of fabricating the flow control device of FIGS. 1 and 2 or FIGS. 3 and 4, in accordance with an embodiment of the present disclosure.

Referring now to FIG. 4, with continued reference to FIG. 3, an isometric view of the tubular body 440 and the faired body 460, and a cutaway isometric view of the flow shield 480 is illustrated in accordance with an embodiment of the present disclosure. As illustrated in FIG. 4, the radially outer surface 474 of the faired body 460 may include one or more channel guides 470 extending away from the radially outer surface 474 and toward the radially inward surface 492 of the flow shield 480. Advantageously, the channel guides 470 help to straighten or guide the flow of the particle-laden gas 301 within the passageway 420 formed between the radially outer surface 474 of the faired body 460 and the radially inward surface 492 of the flow shield 480. Also, the channel guides 470 help reduce the amount of the particle-laden gas 301 that may enter the passageway 420 through the inlet 410 and then exit back out of the passageway 420 through the inlet 410.

In one embodiment, the channel guides 470 may extend partially across the passageway 420 and terminate in the passageway 420 prior to contacting the radially inward surface 492 of the flow shield 480. In another embodiment, the channel guides 470 may extend completely across the passageway 420 and to contact the radially inward surface 492 of the flow shield 480. It is understood that the embodiments disclosed herein are also applicable to faired bodies 460 without channel guides 470.

Referring now to FIG. 5, with continued reference to FIGS. 1-4, a flow chart of method 500 of fabricating a flow control device 110, 310 is illustrated, in accordance with an embodiment of the disclosure.

At block 504, a tubular body 240, 440 is formed. The tubular body 240, 440 includes a tubular wall 246, 446, an inner surface 252, 452, an outer surface 254, 454, and one or more openings 250, 450 extending from the outer surface 254, 454 to the inner surface 252, 452 through the tubular wall 246, 446.

At block 506, a faired body 260, 460 formed. The faired body 260, 460 includes a radially inner surface 272, 472, a radially outer surface 274, 474, and a channel portion 268, 468 defined by the radially inner surface 272, 472 within the faired body 260, 460.

At block 508, a flow shield 280, 480 is formed. The flow shield 280, 480 includes a radially inward surface 292, 492, a radially outward surface 294, 494, and an interior chamber 288, 488 defined by the radially inward surface 292, 492 within the flow shield 280, 480.

At block 510, the faired body 260, 460 is arranged at least partially within the flow shield 280, 480 such that the radially inward surface 292, 492 is in a facing spaced relationship with the radially outer surface 274, 474 of the faired body 260 defining a passageway 220, 420 therebetween.

The tubular body 240, 440 is arranged at least partially within the channel portion 268, 468 such that the passageway 220, 420 is fluidly connected to the one or more openings 250, 450.

The method 500 may further include that a passageway portion 248, 448 is formed within the tubular body 240, 440 to direct particle-laden gas 101, 301 from the passageway 220, 420 through the one or more openings 250, 450 into the passageway portion 248, 448 and to an inlet 106, 306 of a particle concentration measurement sensor 105, 305. The particle-laden gas 101, 301 includes particles of fire suppression agent suspended in a gas and the particle concentration measurement sensor 105, 305 measures a concentration of the fire suppression agent in the gas.

While the above description has described the flow process of FIG. 5 in a particular order, it should be appreciated that unless otherwise specifically required in the attached claims that the ordering of the steps may be varied.

Technical effects and benefits of the features described herein include a using a omnidirectional inlet to pull in a particle laden gas from three hundred and sixty degrees around the inlet and slowly accelerating the particle-laden gas through a bell shaped passage to a velocity of the vacuum pulling the particle-laden gas to avoid particles of the fire suppression agent separating from the gas.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow control device comprising:

a tubular body comprising a tubular wall with an inner surface, an outer surface, and one or more openings extending from the outer surface to the inner surface through the tubular wall;

a faired body encircling the tubular body, the faired body comprising a radially inner surface and a radially outer surface; and a flow shield encircling the faired body, the flow shield comprising a radially inward surface and a radially outward surface, the radially inward surface being in a facing spaced relationship with the radially outer surface of the faired body defining a passageway therebetween, wherein the passageway is fluidly connected to the one or more openings;

wherein:

the device includes a housing and a vacuum source coupled to an outlet of the housing;

the tubular body extends from a first tubular end to a second tubular end that are opposite each other, the second tubular end is connected to the housing;

the faired body is operationally connected to the tubular body proximate or at the first tubular end and located at a first distance away from the first tubular end, and the openings in the tubular body are located between the faired body and the first tubular end; and the flow shield is operably connected to the tubular body proximate or at the first tubular end and covers the first tubular end, and the openings within the tubular body are located between the flow shield, and the faired body and encircles the faired body and the tubular wall.

2. The flow control device according to claim 1, further comprising:

an inlet defined between the radially inward surface of the flow shield and the radially outer surface of the faired body, wherein the passageway extends from the inlet to the one or more openings.

3. The flow control device according to claim 2, wherein the inlet is an omnidirectional orifice extending a full three hundred and sixty degrees around the faired body.

4. The flow control device according to claim 1, wherein the passageway has a rotationally axisymmetric bell shaped curve.

5. The flow control device according to claim 1, wherein the faired body has a bell shape and is rotationally axisymmetric.

6. The flow control device according to claim 1, wherein the flow shield has a bell shape and is rotationally axisymmetric.

7. The flow control device according to claim 1, wherein the faired body has a first faired body end and a second faired body end located opposite the first faired body end, and wherein the radially outer surface of the faired body has a first outer diameter proximate or at the first faired body end and the radially outer surface of the faired body has a second outer diameter proximate or at the second faired body end, the second outer diameter being greater than the first outer diameter.

8. The flow control device according to claim 7, wherein an outer diameter of the radially outward surface increases exponentially from the first outer diameter to the second outer diameter.

9. The flow control device according to claim 1, wherein the flow shield has a first flow shield end and a second flow shield end located opposite the first flow shield end, and wherein the radially inward surface of the flow shield has a first inner diameter proximate or at a first distance away from the first flow shield end and the radially inward surface of the flow shield has a second inner diameter proximate or at the second flow shield end, the second inner diameter being greater than the first inner diameter.

10. The flow control device according to claim 9, wherein an inner diameter of the radially inward surface increases exponentially from the first inner diameter to the second inner diameter.

11. The flow control device according to claim 1, wherein the tubular body further comprises a passageway portion defined by the inner surface, and wherein a transition from the passageway to the passageway portion of the tubular body is configured to turn a particle-laden gas one hundred and eighty degrees.

12. The flow control device according to claim 1, wherein the faired body further include one or more channel guides extending away from the radially outer surface of the faired body and toward the radially inward surface of the flow shield.

13. The flow control device according to claim 1, wherein the tubular body further comprises a passageway portion defined by the inner surface, and wherein a transition from the passageway to the passageway portion of the tubular body is configured to turn a particle-laden gas about-ninety degrees.

14. A method of fabricating a flow control device comprising:
- forming a tubular body comprising a tubular wall with an inner surface, an outer surface, and one or more openings extending from the outer surface to the inner surface through the tubular wall;
- forming a faired body comprising a radially inner surface, a radially outer surface, and a channel portion defined by the radially inner surface within the faired body;
- forming a flow shield the flow shield comprising a radially inward surface, a radially outward surface, and an interior chamber defined by the radially inward surface within the flow shield;
- arranging the faired body at least partially within the flow shield such that the radially inward surface is in a facing spaced relationship with the radially outer surface of the faired body defining a passageway therebetween; and
- arranging the tubular body at least partially within the channel portion such that the passageway is fluidly connected to the one or more openings;

wherein:
- the device includes a housing and a vacuum source coupled to an outlet of the housing;
- the tubular body extends from a first tubular end to a second tubular end that are opposite each other, the second tubular end is connected to the housing;
- the faired body is operationally connected to the tubular body proximate or at the first tubular end and located at a first distance away from the first tubular end, and the openings in the tubular body are located between the faired body and the first tubular end; and
- the flow shield is operably connected to the tubular body proximate or at the first tubular end and covers the first tubular end, and the openings within the tubular body are located between the flow shield and the faired body and encircles the faired body and the tubular wall.

15. The method of claim 14, further comprising:

forming a passageway portion within the tubular body to a direct particle-laden gas from the passageway through the one or more openings into the passageway portion and to an inlet of a particle concentration measurement sensor.

16. The method of claim 15, wherein the particle-laden gas includes particles of fire suppression agent suspended in a gas and the particle concentration measurement sensor measures a concentration of the fire suppression agent in the gas.

* * * * *